Sept. 30, 1930. S. S. UDELEWITZ 1,776,939

PNEUMATIC JACK AND SHOCK ABSORBER

Filed June 17, 1929

Inventor:
Soloman S. Udelewitz
By Chapin & Ferguson
Attorney.

Patented Sept. 30, 1930

1,776,939

UNITED STATES PATENT OFFICE

SOLOMAN S. UDELEWITZ, OF BALTIMORE, MARYLAND

PNEUMATIC JACK AND SHOCK ABSORBER

Application filed June 17, 1929. Serial No. 371,414.

This invention relates to improvements in pneumatic jacks and shock absorbers for use on motor vehicles, and has for its object to provide a simple and efficient device which may be operated by the driver, from within the car, for raising and lowering the front or rear of the car for the purpose of changing the tires, and which may be connected to the spring of the vehicle when used as a shock absorber.

The invention consists of the novel construction and arrangement of the parts and combination of the parts hereinafter more fully set forth in the following specification and pointed out in detail in the appended claim.

Figures 1, 2:
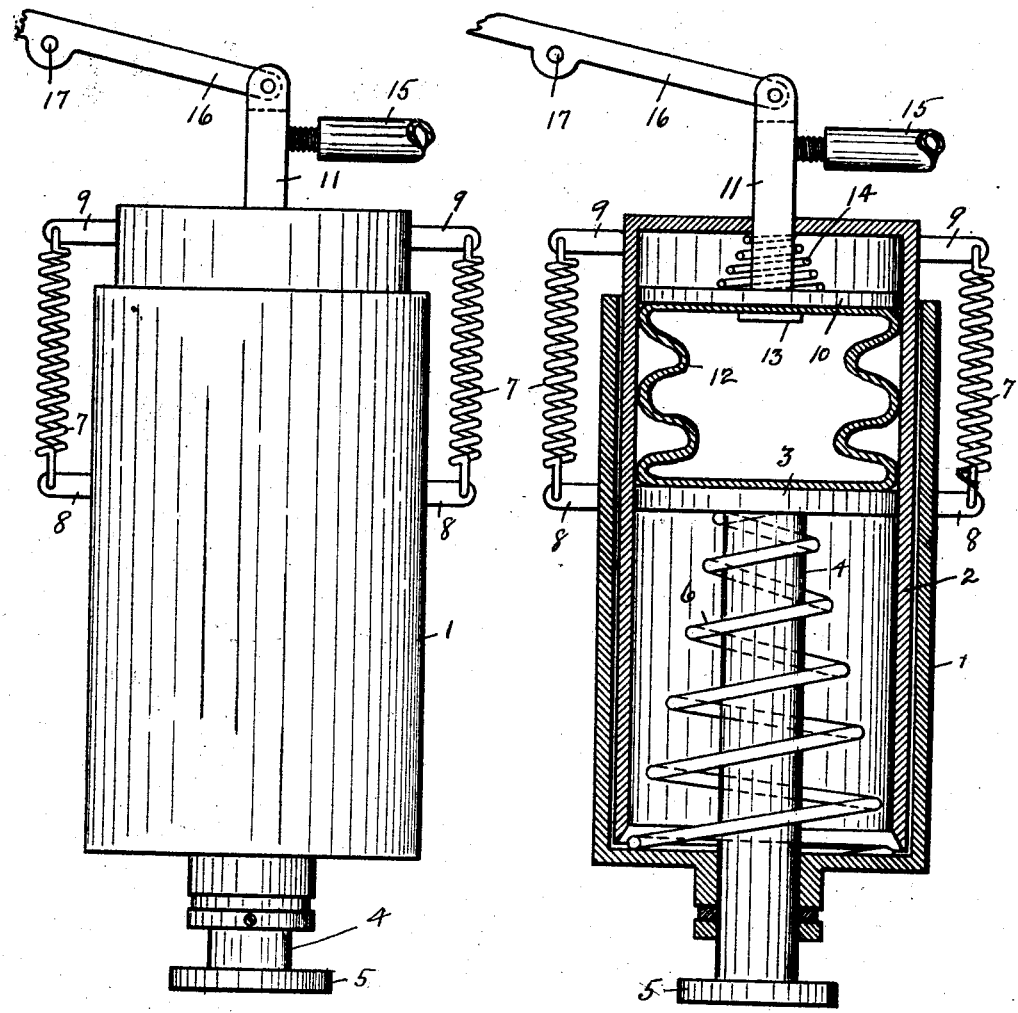
Figure 1 is a side elevation of my invention.
Figure 2 is a vertical longitudinal section of Figure 1.
Figure 3:
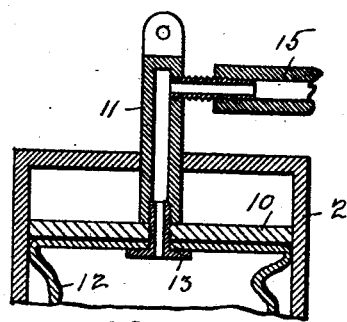
Figure 3 is a detail section of the upper part of the inner cylinder.

Referring to the accompanying drawing, forming part of this specification, and in which like reference numerals designate like parts throughout the several views thereof, 1 designates the outer cylinder and 2 the inner cylinder. The outer cylinder 1 is open at the upper end to receive the inner cylinder 2, which latter is open at its lower end. Within the inner cylinder 2 is a piston 3 having a stem 4 which projects through the lower end of the cylinder 1, and has a shoe 5 on its lower end. The coiled spring 6 surrounds the stem 4 between the piston 3 of the lower inner surface of the outer cylinder 1. The said spring 6 is adapted to fold within itself when pressed together and serves to keep the piston 3 in its normal position. The outer cylinder 1 fits over the inner cylinder 2 and is adapted to move vertically thereon and is held in its normal position, as shown in Figure 2, by the springs 7, which latter have their lower ends connected to the ears 8 on the outer surface of the cylinder 1 and their upper ends connected to the ears 9 on the outer surface of the inner cylinder 2 within the cylinder 2 is another piston 10, the stem 11 which is hollow and projects through the upper end of the inner cylinder 2. Between the pistons 3 and 10 is a rubber tube 12 which is secured to the piston 10 by the nipple 13. Between the upper end of the inner cylinder and the piston 10 is a coiled spring 14. The piston stem 11 is connected by the tube 15 to any suitable source supplying air to the tube 12. Connected to the upper end of the piston 11 is an arm 16 which is pivoted at 17 to the frame of the automobile when the device is to be used as a shock absorber. The extremity of the arm 16 being connected to the automobile spring (not shown). The inner cylinder 1 is adapted to be connected to the axle of the vehicle on which it is to be used and when it is desired to raise the car for the purpose of changing a tire the air is forced through the tube 15 and piston stem 11 to the rubber tube 12 which forces the piston 3 down until the foot 5 comes in contact with the ground. The air pressure will then force the piston 3 down to the bottom, the outer cylinder 1 and the continued pressure of air will cause the outer cylinders to move upon each other until the car is raised to the proper position for changing the tire. When the device is used as a shock absorber a certain amount of air is retained in the rubber tube 12 and the arm 16 cooperating with the spring of the machine will operate the piston 10 and take up any shock.

Having thus described my invention what I claim is:

A pneumatic jack and shock absorber comprising an outer cylinder having an open upper end and an aperture in its lower end, an inner cylinder fitted within said outer cylinder and having a closed upper end and an open lower end, said two cylinders being adapted to move vertically with respect to each other, means for holding the said cylinders in their normal position, a piston within the inner cylinder having a stem projecting through the aperture in the lower end of the outer cylinder and having a foot on its lower end, a coiled spring between said piston and outer cylinder, a piston within said inner cylinder having a hollow stem projecting through the upper end and said inner cylinder, a flexible tube fitted between said two pistons and having communication with the hollow stem of the upper piston, a flexible pipe connecting said hollow stem of the last mentioned piston with a suitable source of air supply.

In testimony whereof I affix my signature.

SOLOMAN S. UDELEWITZ.